(12) United States Patent
Vipat

(10) Patent No.: US 7,877,504 B2
(45) Date of Patent: Jan. 25, 2011

(54) TECHNIQUES FOR ENTRY LOOKUPS

(75) Inventor: Harshawardhan Vipat, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 2356 days.

(21) Appl. No.: 10/231,542

(22) Filed: Aug. 29, 2002

(65) Prior Publication Data

US 2004/0044787 A1    Mar. 4, 2004

(51) Int. Cl.
*G06F 15/16* (2006.01)

(52) U.S. Cl. .................. 709/238; 709/232; 709/236; 709/237; 709/239; 709/242; 709/243; 709/245; 709/247; 709/249; 711/202; 711/206; 711/207; 370/395.5; 370/409; 370/470; 370/471

(58) Field of Classification Search ........... 709/232, 709/236–238, 239, 242–247, 249; 711/202, 711/206, 207; 370/395.5, 409, 470, 471
See application file for complete search history.

(56) References Cited

U.S. PATENT DOCUMENTS

| | | | | |
|---|---|---|---|---|
| 6,041,053 A * | 3/2000 | Douceur et al. | ............. | 370/389 |
| 6,061,712 A | 5/2000 | Tzeng | | |
| 6,411,626 B1 | 6/2002 | Shinohara | | |
| 6,658,482 B1 * | 12/2003 | Chen et al. | ............. | 709/245 |
| 6,678,678 B2 * | 1/2004 | Lee et al. | ............. | 707/3 |
| 6,697,380 B1 * | 2/2004 | Egbert et al. | ............. | 370/469 |
| 6,804,230 B1 * | 10/2004 | Jennings et al. | ............. | 370/388 |
| 7,007,101 B1 * | 2/2006 | Schwaderer | ............. | 709/238 |
| 7,031,341 B2 * | 4/2006 | Yu | ............. | 370/469 |
| 7,035,256 B1 * | 4/2006 | Neufeld et al. | ............. | 370/389 |
| 7,058,725 B2 * | 6/2006 | Mathew et al. | ............. | 709/238 |
| 7,085,235 B2 * | 8/2006 | Pin et al. | ............. | 370/235 |
| 7,111,071 B1 * | 9/2006 | Hooper | ............. | 709/238 |
| 7,149,216 B1 * | 12/2006 | Cheriton | ............. | 370/392 |
| 2003/0037042 A1 * | 2/2003 | Kametani | ............. | 707/3 |

FOREIGN PATENT DOCUMENTS

| WO | WO 98/43168 | 10/1998 |
|---|---|---|
| WO | WO 99/00935 | 1/1999 |
| WO | WO 99/13620 | 3/1999 |
| WO | WO 00/56024 | 9/2000 |

\* cited by examiner

*Primary Examiner*—Rupal D Dharia
*Assistant Examiner*—Van Kim T Nguyen
(74) *Attorney, Agent, or Firm*—Caven & Aghevli LLC

(57) ABSTRACT

Techniques to store entries so that minimal sequential memory accesses are used to determine all relevant entries. Entries may be grouped into blocks. The order of entries within blocks may be set in a manner so that entry locations can be determined using an input value, such as a destination address. Blocks may be ordered into levels. Blocks of each level may be stored in consecutive storage locations. Accordingly, entry locations may be determined and retrieved with minimal sequential memory accesses by storing entries in a predetermined manner.

48 Claims, 9 Drawing Sheets

Location B1 = Root + Nibble1

Location B2 = Root + (1+Nibble1)*BlockSize+ Nibble2

Location B3 = Root + (1+N + Nibble1*N + Nibble2) *BlockSize + Nibble3

Location B4 = Root + (1+N+N² + Nibble1*N² + Nibble2*N + Nibble3)*BlockSize + Nibble4

FIG. 7

TECHNIQUES FOR ENTRY LOOKUPS

FIELD

The subject matter disclosed herein generally relates to memory systems and more particularly to techniques to store and retrieve content.

RELATED ART

In a network of interconnected computers, routing devices receive packets at one of a set of input interfaces and forward packets to one of a set of output interface ports. The routing device typically determines an output interface port for an incoming packet as quickly as possible. Each packet typically includes a header that includes information used for routing the packet to an output interface port and for forwarding the packet to a destination device. Header information used for routing may include a destination address, a protocol identifier, packet length, and a priority for the packet.

The routing device may use the packet's destination address to search a routing table for the appropriate routing information. Routing information may refer to any information used for forwarding packets through the routing device, such information may include a port number, an interface number, channel identifiers, queue identifiers and so forth. One method to implement a routing table is to use Trie blocks. A Trie block may refer to a node of a particular data structure, such as a tree structure.

FIG. 1A depicts an example manner in which routing information can be stored using Trie blocks. Each block includes the same number of Trie-entries. Each Trie-entry includes a next hop and a next block pointer. One or more of the retrieved next hops can be used to determine an output interface port associated with a packet destination address. A next block pointer may refer to a storage location of a block that stores another relevant Trie-entry. In the example of FIG. 1A, routing information may be divided into groups of 4 bits. Each of the 4 bits may be used to identify a location within each block in which to store relevant next hops. In this example, the next hop of the fourth block, R4, may be the only next hop that stores information that can be used to determine routing information.

To retrieve Trie-entries associated with a packet destination address, locations of relevant Trie-entries within blocks may be determined using so-called "nibbles" of the destination address. For example, with reference to FIG. 1B, a thirty-two (32) bit destination address may include eight nibbles when each nibble is four bits. For example, the first nibble (0101) may be used to determine the location of the relevant Trie-entry of a first block, B1. The relevant Trie-entry of block B1 includes a next hop and next block pointer ("NBP"). The next block pointer of the Trie-entry retrieved from block B1 may be used to determine a memory address at which the next relevant block, B2, begins. The second nibble (0100) may be used to determine the relevant Trie-entry within the second block, B2. The Trie walk continues until the next block pointer is a null pointer. In this example the next block pointer of the Trie-entry retrieved from the fourth block, B4, is a null pointer. The next hop of the fourth block, B4, may be used to determine routing information (e.g., an output interface port number) associated with the destination address.

To determine locations of relevant next hops in the techniques described with respect to FIGS. 1A and 1B, there are multiple memory accesses that do not substantially overlap in time (i.e., sequential memory accesses). The latencies incurred by sequential memory accesses may limit the speed at which a routing device may determine a destination for an incoming packet and transmit the packet.

BRIEF DESCRIPTION OF THE DRAWINGS

FIG. 7 depicts a relationship that may be used to determine locations of Trie-entries in accordance with an embodiment of the present invention.

Note that use of the same reference numbers in different figures indicates the same or like elements.

DETAILED DESCRIPTION

Figure 2:
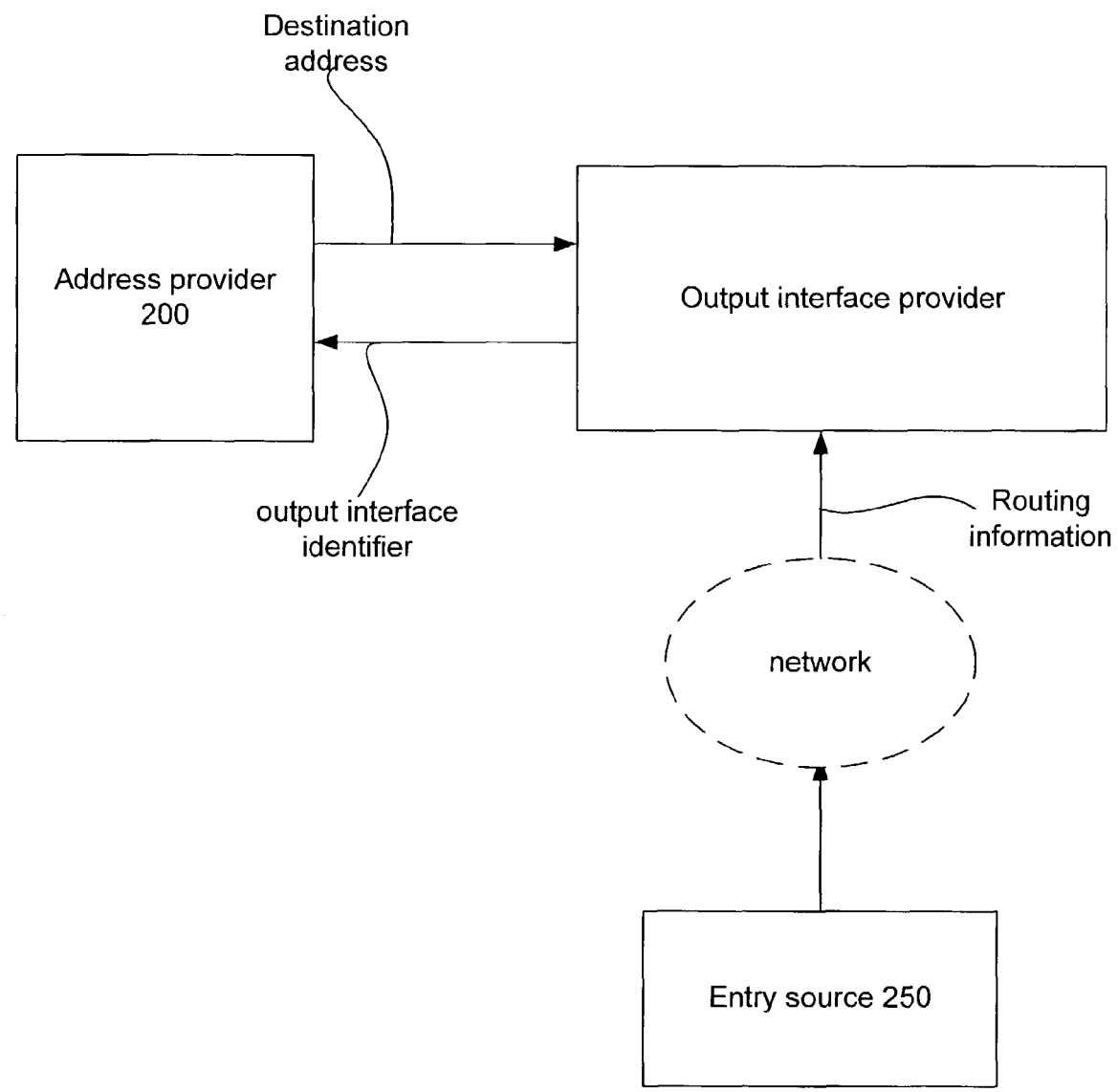
FIG. 2 depicts in block diagram form an example system in which some embodiments of the present invention may be used.

FIG. 2 depicts in block diagram form an example system in which some embodiments of the present invention may be used. An address provider 200 may provide a destination address to an output interface provider. Entry source 250 may provide routing information to the output interface provider. Entry source 250 may use the Internet or some other network of interconnected computers to provide routing information to the output interface provider. For example, entry source 250 may create and maintain routing information using a routing protocol, such as Border Gateway Protocol (BGP), described for example in RFC 1771 BGP-4, March 1995. The output interface provider may store routing information as Trie-entries. The output interface provider may use one or more Trie-entries to determine output interface identifiers that identify output interface port numbers associated with destination addresses. The output interface provider may provide output interface identifiers to the address provider 200.

Figure 3:
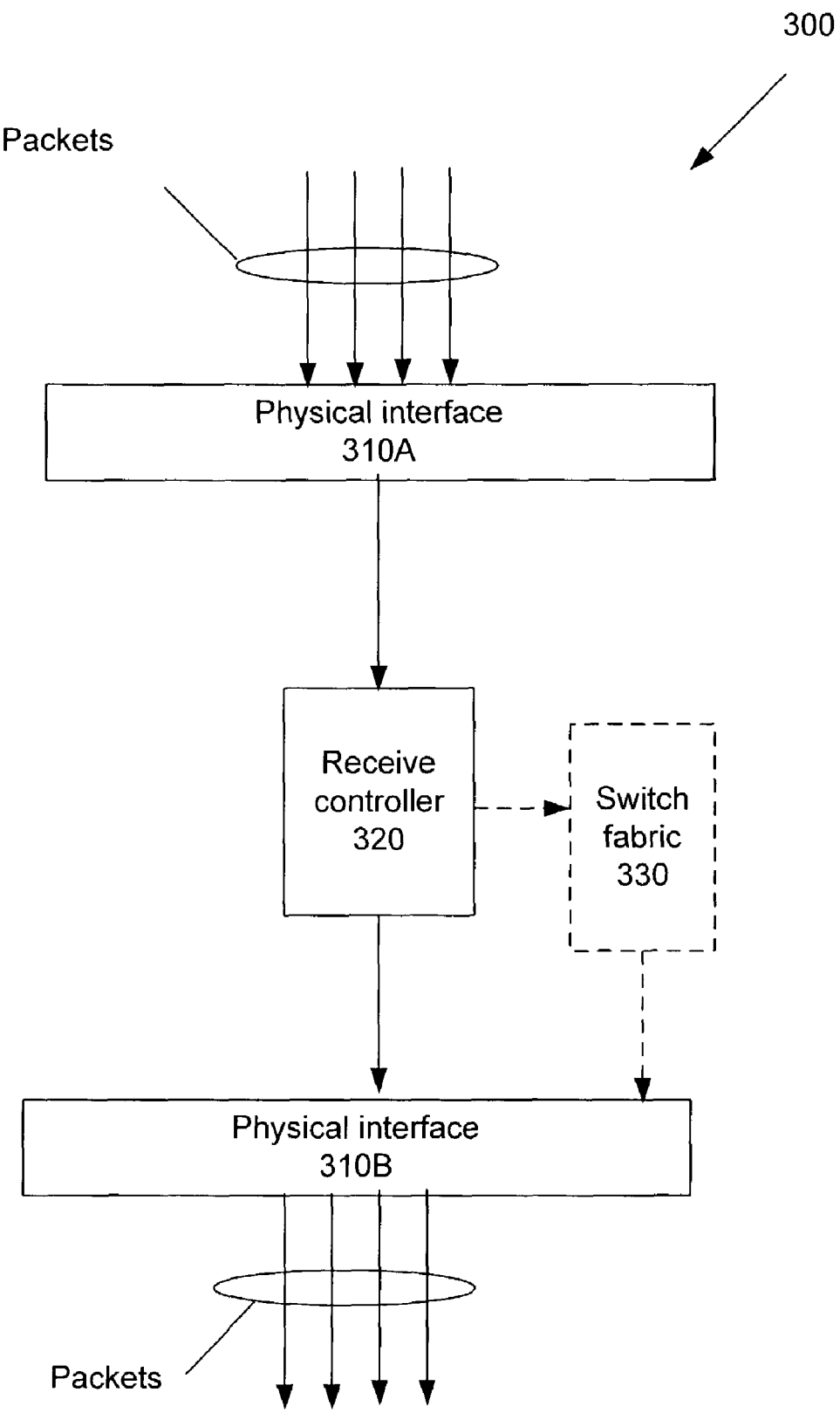
FIG. 3 depicts in block diagram form one possible example of a router.

FIG. 3 depicts in a router 300 one possible system in which an embodiment of the present invention may be used. Router 300 may perform layer 3 switching of packets. Router 300 may receive packets having addresses provided in accordance with Internet Protocol Version 4 (IPv4), and/or Internet Protocol Version 6 (IPv6) (in compliance for example with the Internet Engineering Task Force (IETF) Draft Standard, Aug. 10, 1998). Packets may be encapsulated as media access control (MAC) frames in accordance with the Ethernet protocol, described for example in versions of IEEE 802.3. Any protocols may be used to transmit packets such as optical transport network (OTN), Synchronous Optical Network (SONET), and/or Synchronous Digital Hierarchy (SDH) standards. Example optical networking standards may be described in ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996).

Router 300 may include physical interfaces 310A and 310B, receive controller 320, and switch fabric 330. Physical interface 310A may include multiple input ports by which to receive packets from other devices such as other switches, routers or computers. Physical interface 310B may include multiple output ports by which to transmit packets to other devices such as other switches, routers or computers. Receive controller 320 may receive packets from the physical interface 310A, process packets, and provide packets to the physical interface 310B for transmission to other devices.

The receive controller 320 may determine routing treatments for received packets and may rewrite packet headers and/or alter routing-related information in packet headers. These routing treatments may include selection of one or more output interface ports of physical interface 310B to which to forward received packets. Receive controller 320 may forward packets and associated routing treatments to switch fabric 330. Switch fabric 330 may route packets to designated output interface ports of physical interface 310B. Some embodiments of the present invention described herein may be used by receive controller 320 to assist in determining packet routing treatments.

Some embodiments of the present invention may be used in Intel Corporation's IXP 1200 series family of processors or in design development kits that allow engineers to design routers.

Figure 4:
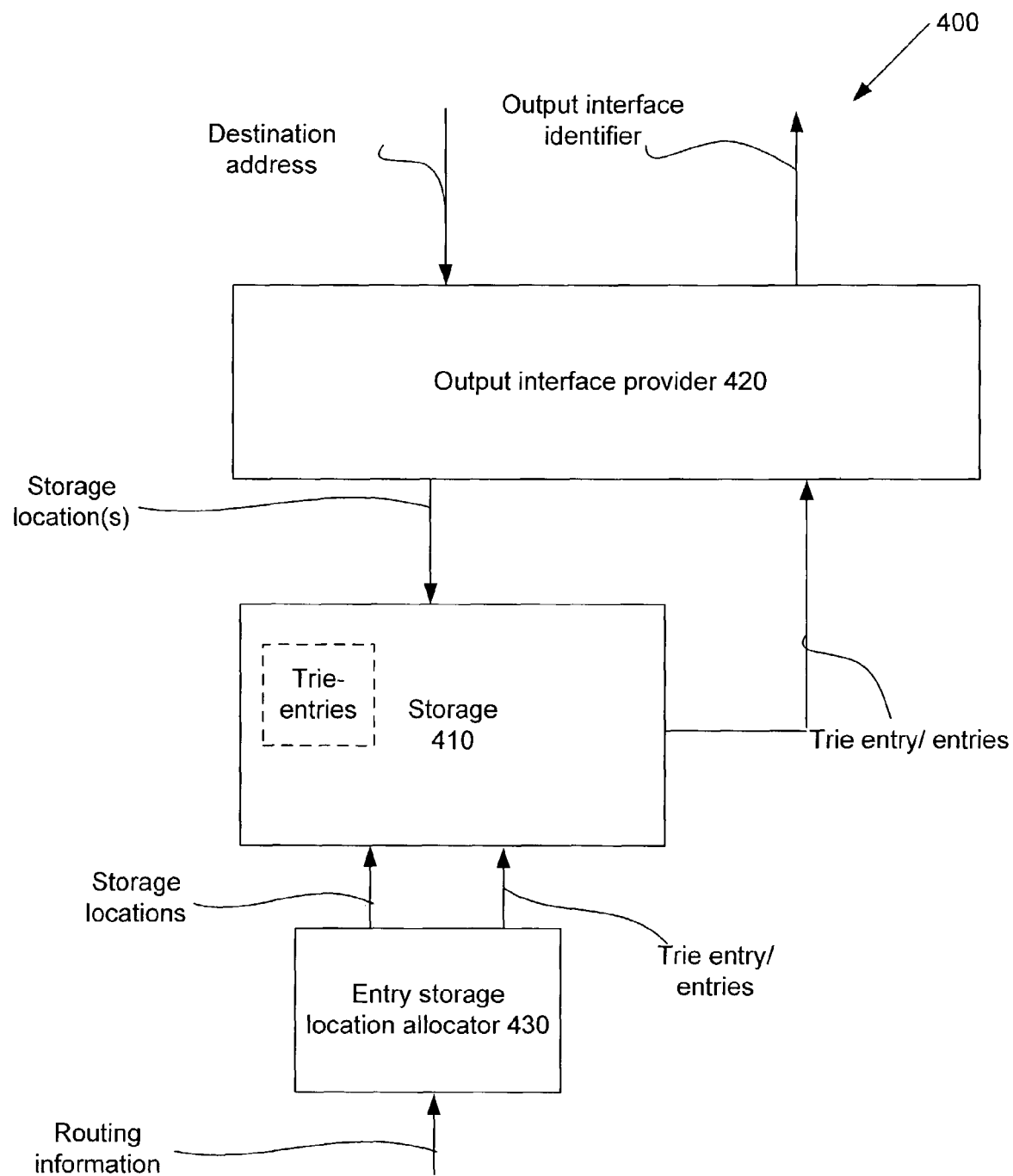
FIG. 4 depicts an example implementation of an output interface provider in accordance with an embodiment of the present invention.

FIG. 4 depicts an example implementation of an output interface provider 400 in accordance with an embodiment of the present invention. Output interface provider 400 may include storage 410, output interface provider 420, and entry storage location allocator 430.

Figure 6:
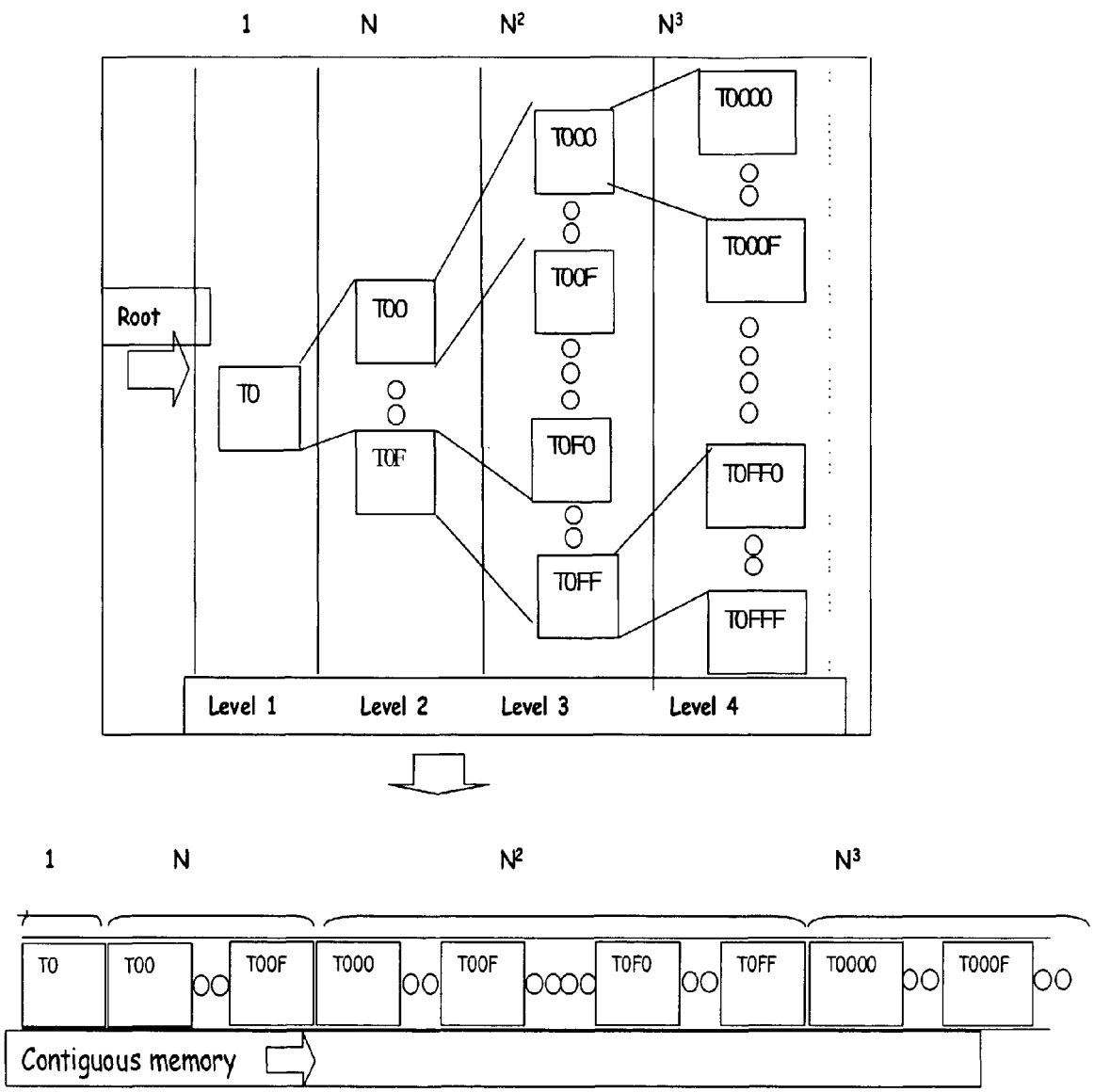
FIG. 6 depicts an order by which Trie-entries may be stored in accordance with an embodiment of the present invention.

Entry storage location allocator 430 may manage storage of Trie-entries within storage 410 according to techniques described with respect to FIG. 6. Storage 410 may store Trie-entries that can be used to derive output interface identifiers from packet destination addresses. For example, the output interface identifier may correspond to a MAC address (when the standard is Ethernet (described in IEEE 802.3)) or an output interface port number. Storage 410 may be implemented as a storage device that permits multiple simultaneous reads such as an SRAM or DRAM memory device. Output interface provider 420 may receive a destination address and request storage 410 to provide information such as one or more Trie-entries that may be used to derive an output interface identifier associated with the destination address. Output interface provider 420 and entry storage location allocator 430 may be implemented as software instructions or machine readable instructions executed by a microprocessor, application specific integrated circuits (ASIC), and/or as a field programmable gate array (FPGA).

Figure 5:
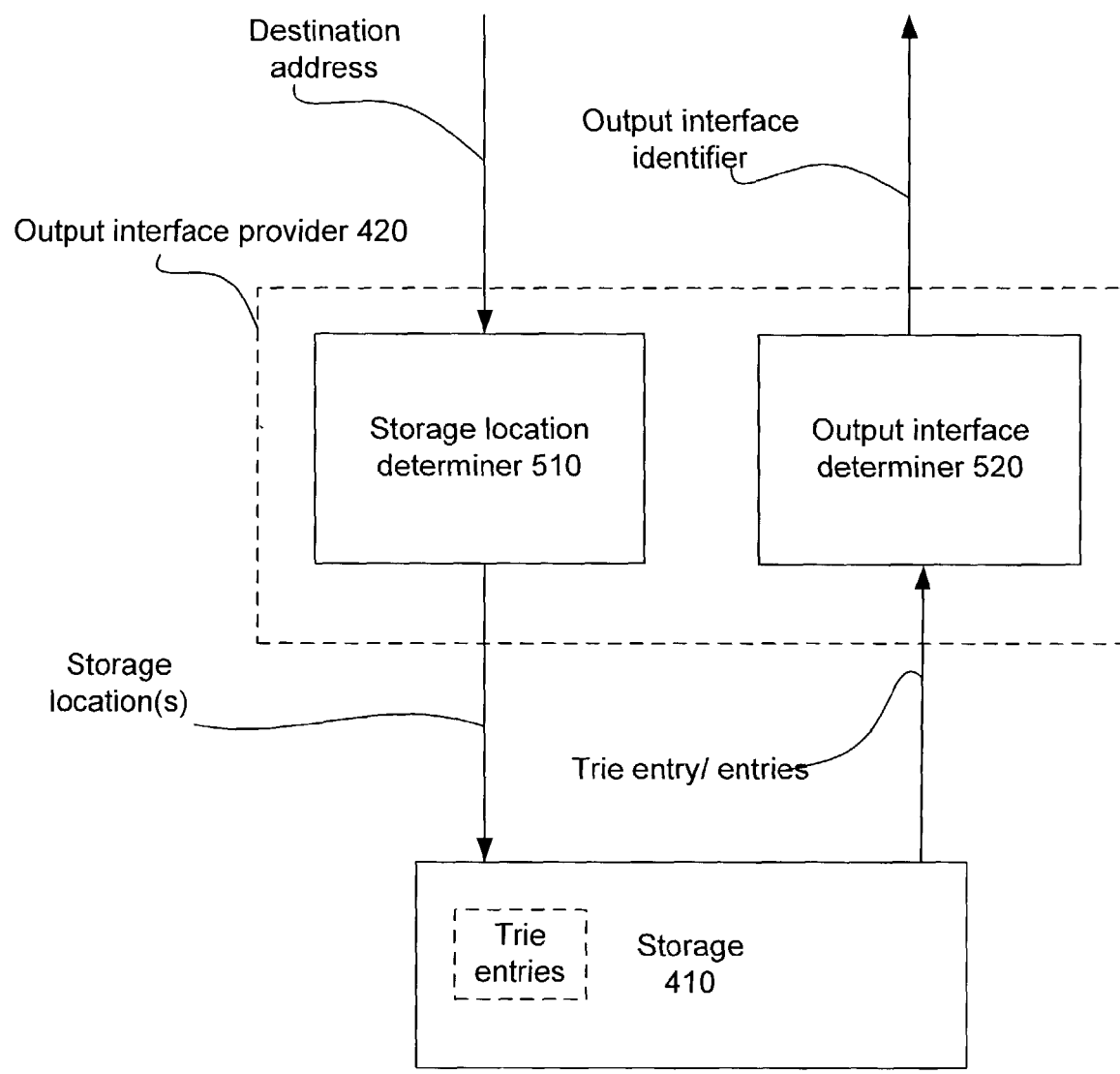
FIG. 5 depicts one possible implementation of an address lookup device in accordance with an embodiment of the present invention.

In accordance with an embodiment of the present invention, FIG. 5 depicts one possible implementation of output interface provider 420. Output interface provider 420 may include a storage location determiner 510 and output interface determiner 520. Storage location determiner 510 may receive a destination address and determine locations in storage 410 of relevant Trie-entries. For example, storage location determiner 510 may determine storage locations of such Trie-entries using the technique described with respect to FIG. 7 below. Storage location determiner 510 may provide a read request and storage locations to storage 410. In response to the read request and storage locations, storage 410 may provide one or more Trie-entries to output interface determiner 520. Output interface determiner 520 may use one or more of the Trie-entries to determine an output interface identifier associated with the destination address.

In accordance with an embodiment of the present invention, entry storage location allocator 430 may store routing information as Trie-entries in storage 410 in accordance with a manner described with respect to FIG. 6. Entry storage location allocator 430 may determine storage locations of Trie-entries according to the relationship described with respect to FIG. 7. In this example, each element that begins with a T represents a block of sixteen (16) Trie-entries. Although, a block can include any number of Trie-entries. The number of Trie-entries in each block may be related to the number of bits in each nibble (described below with respect to FIG. 7). Techniques described with respect to FIG. 1A may be used solely to allocate routing information among locations within blocks. In this example, each Trie-entry in each block may correspond to a next hop (described with respect to FIG. 1A) and the Trie-entries may not include next block pointers. A predetermined storage order of blocks can be used to determine relevant next hops and thereby next block pointers may not be stored. Not storing next block pointers may provide an advantage of saving storage locations in a storage device.

However, in some implementations, Trie-entries may include next block pointers that may be used to determine storage locations of relevant next hops. For example, if all Trie-entries of routing information are not stored in the manner described with respect to FIG. 6, then next block pointers may be used to determine locations of relevant next hops in a manner similar to that described with respect to FIG. 1B.

Figure 1A:
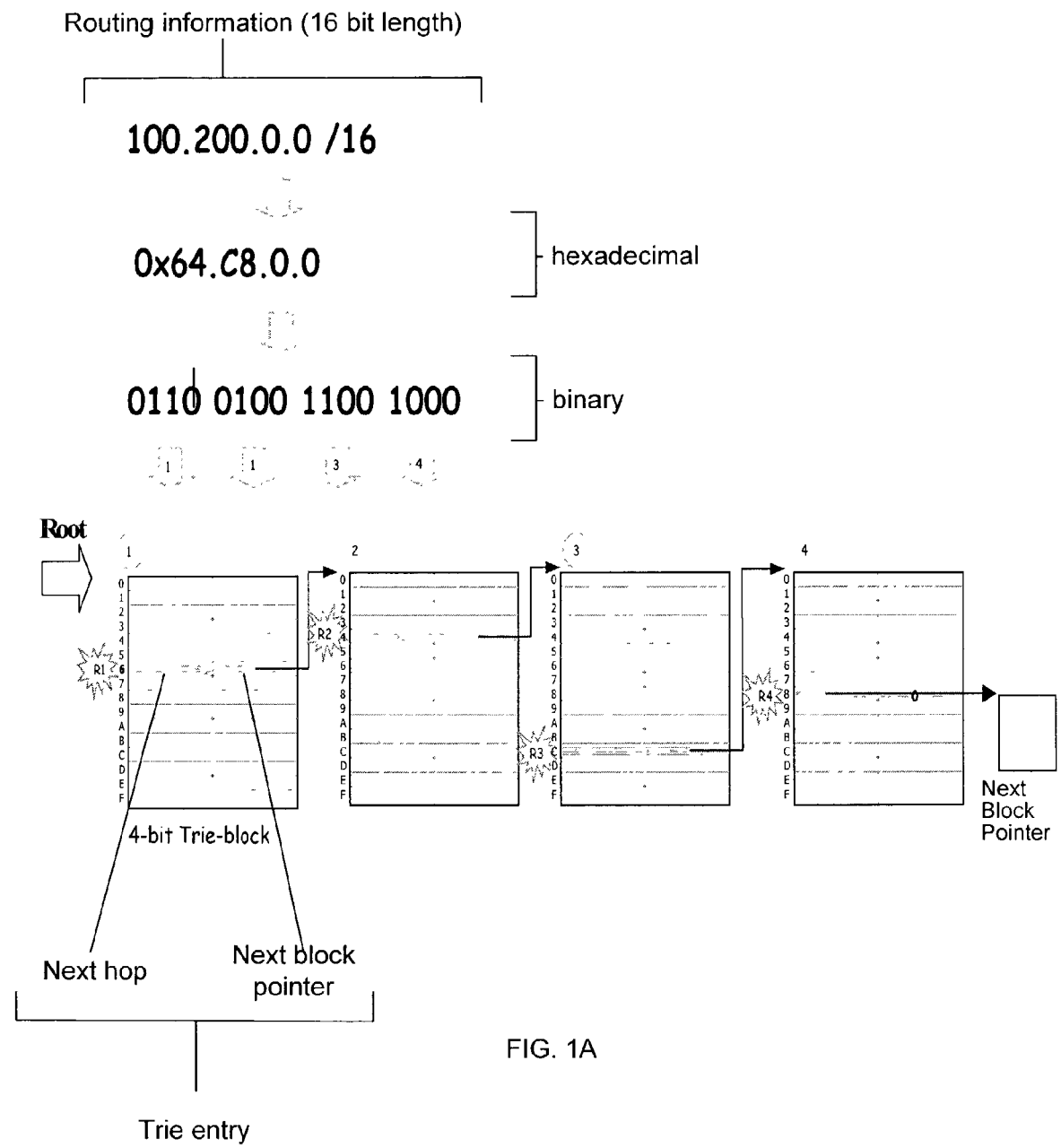
FIGS. 1A and 1B depict an example manner in which Trie-entries may be stored and retrieved.
Figure 1B:
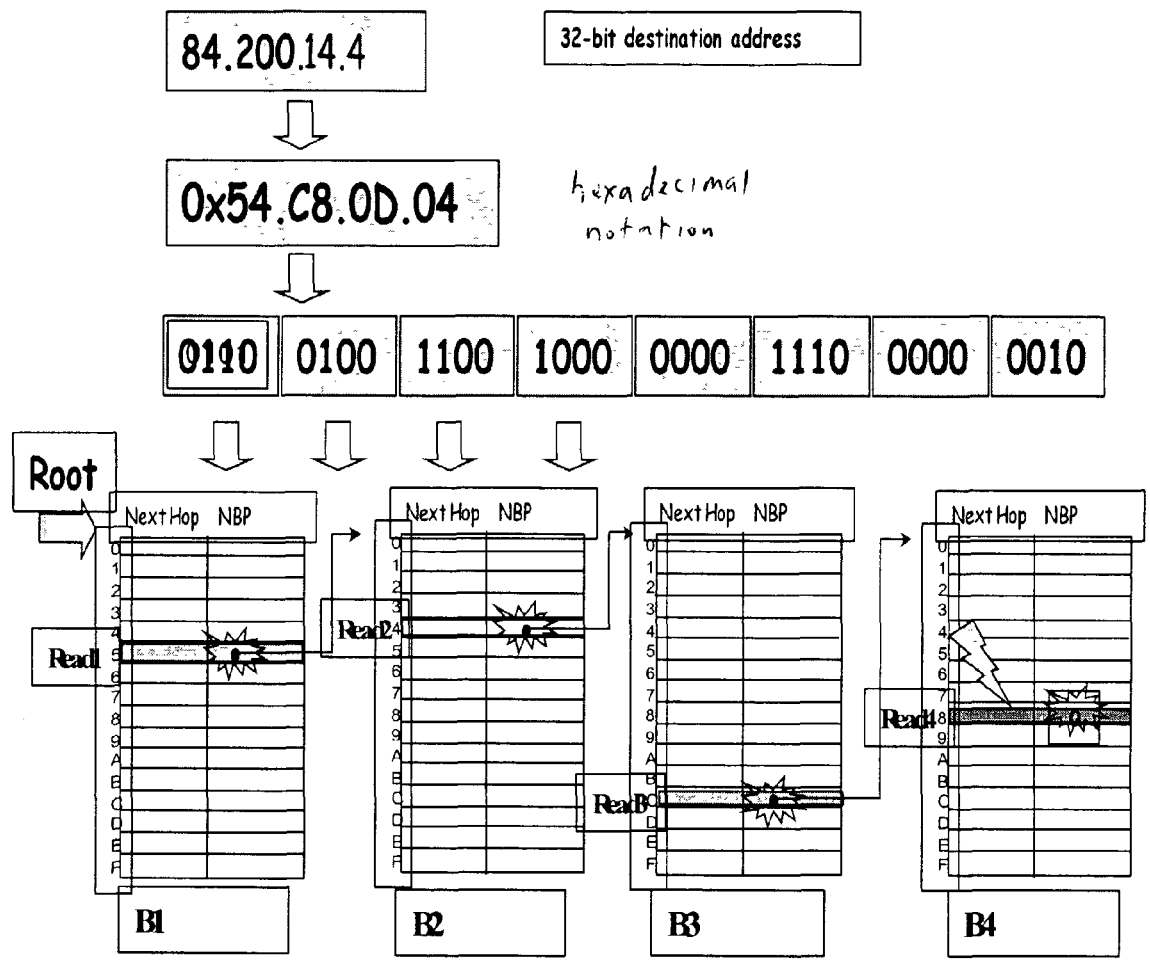

In the example of FIG. 1A, each next block pointer could reference sixteen (16) blocks. In this example, each block may serve as a reference for a number of blocks that a next block pointer could reference, e.g., sixteen (16). Although each block has been described as serving as a reference for sixteen (16) different blocks, a block may serve as a reference for any number of other blocks or Trie-entries. For example, block T0 may serve as a reference block for blocks T00 to T0F (16 different blocks). Each of blocks T00 to T0F may serve as reference blocks for sixteen different blocks. For example, block T00 may serve as a reference block for blocks T000 to T00F. Similarly, block T01 may serve as a reference block for blocks T010 to T00F. Each of blocks T000 to T0F0 may serve as a reference block for sixteen different blocks. For example, block T000 may serve as a reference block for blocks T0000 to T000F. Similarly, block T001 may serve as a reference block for blocks T0010 to T001F.

Blocks may be allocated among levels. In this example, blocks may be allocated among four levels, although other numbers of levels may be used. For example, level 1 may include block T0; level 2 may include blocks T00 to T0F; level 3 may include blocks T000 to T0FF; and level 4 may include blocks T0000 to T0FFF.

In accordance with an embodiment of the present invention, entry storage location allocator 430 may store blocks of each level in sequential storage locations of storage 410. In addition, within each level, entry storage location allocator 430 may store blocks associated with a reference block in sequential storage locations of storage 410. For example, entry storage location allocator 430 may store Trie-entries of block T0 of level 1 in sequential storage locations of storage 410. The last Trie-entry of block T0 may be stored adjacent to the first Trie-entry of block T00 of level 2. Entry storage location allocator 430 may store Trie-entries of blocks T00 to T0F in sequential storage locations of storage 410. In a storage location adjacent to that of the last Trie-entry of T0F of level 2, entry storage location allocator 430 may store the first Trie-entry of block T000 of level 3. Entry storage location allocator 430 may store Trie-entries of blocks T000 to T0FF in sequential storage locations of storage 410. In a storage location adjacent to the last Trie-entry of block T0FF (level 3), storage 410 may store the first Trie-entry of block T0000 (level 4). Entry storage location allocator 430 may store Trie-entries of blocks T0000 to T0FFF in sequential storage locations of storage 410. Blocks T0000 to T000F have block T000 as a reference block and accordingly, entry storage location allocator 430 may store blocks T0000 to T000F in sequential storage locations of storage 410. This example illustrates four (4) levels of block groupings but other numbers of block groupings may be used.

Although a sequential storage order of Trie-entries has been described, other linear or non-linear manners of storage of Trie-entries in storage locations may be used. The associations among a destination address, Trie-entries, and storage locations may be set to minimize the number of sequential accesses to an entry storage device necessary to retrieve Trie-entries associated with a destination address. Herein, an access may refer to one or more retrievals of storage contents that overlap substantially in time. Herein, a sequential access may refer to consecutive accesses that do not substantially overlap in time.

One embodiment of the present invention provides at least a technique to retrieve a Trie-entry or Trie-entries associated with a destination address. This embodiment may include techniques to determine storage location(s) of an Trie-entry or Trie-entries associated with a destination address. This embodiment may be used to determine storage locations of Trie-entries stored in a manner described with respect to FIG. 6. As each access incurs a time delay, this embodiment of the present invention may have the advantage of reducing the number and/or need for sequential accesses.

One manner in which storage locations of Trie-entries may be determined is to use the relationship shown in FIG. 7. In this example of FIG. 7, an output interface identifier may be derived from one Trie-entry. Although, an output interface identifier may be derived from other numbers of Trie-entries. In the relationship of FIG. 7, location B1 represents a storage location of a first Trie-entry. Location B2 represents a storage location of a second Trie-entry. Location B3 represents a storage location of a third Trie-entry. Location B4 represents a storage location of a fourth Trie-entry, which in this example is the Trie-entry from which an output interface identifier may be derived. In other implementations, more or less than four storage locations may be read to determine all relevant Trie-entries.

Variable Root may represent the location of the first Trie-entry of block T0 (FIG. 6) in storage 410.

In the relationship of FIG. 7, each of variables Nibble0, Nibble1, Nibble2, Nibble3 (each hereafter may be referred to as a "nibble") may be derived from the destination address and may be used to indicate the Trie-entry number within each of the four relevant blocks. With respect to this example, there may be four relevant nibbles. However, a destination address may include more or less than four nibbles.

In some implementations, N is $2^k$, where k may be the number of bits in a nibble. In this example, there are four bits in each nibble and N is sixteen (16). In other implentations, the number of bits in each nibble may vary.

Variable BlockSize may represent the product of (1) the number of Trie-entries in a block and (2) the number of bytes in each Trie-entry.

When route-entries are stored in a manner described with respect to FIG. 6, the following table shows the wait time for the retrieval of entries of different lengths. The wait time is expressed as a multiple of time required to complete one access.

| Routing information length | Wait Time expressed as a multiple of time required to complete one access with 4 levels of block preallocation | Wait Time expressed as a multiple of time required to complete one access with 3 levels of pre-allocation |
| --- | --- | --- |
| 4 | 0 | 0 |
| 8 | 0 | 0 |
| 12 | 0 | 0 |
| 16 | 0 | 1 |
| 20 | 1 | 2 |
| 24 | 2 | 3 |
| 28 | 3 | 4 |
| 32 | 4 | 5 |

For example, retrieval of a 20-bit route-entry that is stored using 4-bit trie-block would require 5 accesses without pre-allocation. With four levels of pre-allocation, the first four accesses can be started early and speculatively. Those four accesses can execute concurrently, and can complete before their results are actually needed. This is followed by one sequential access to complete the entire 20-bit retrieval. The resulting wait time is therefore for only one access. With three levels of pre-allocation, the first three accesses can be started speculatively. Those three accesses can execute concurrently followed by the remaining two accesses, which will execute sequentially. The resulting wait time will be therefore for two accesses. Pre-allocation may facilitate speculative and concurrent execution of accesses and reduces overall wait time for the retrieval.

Figure 8:
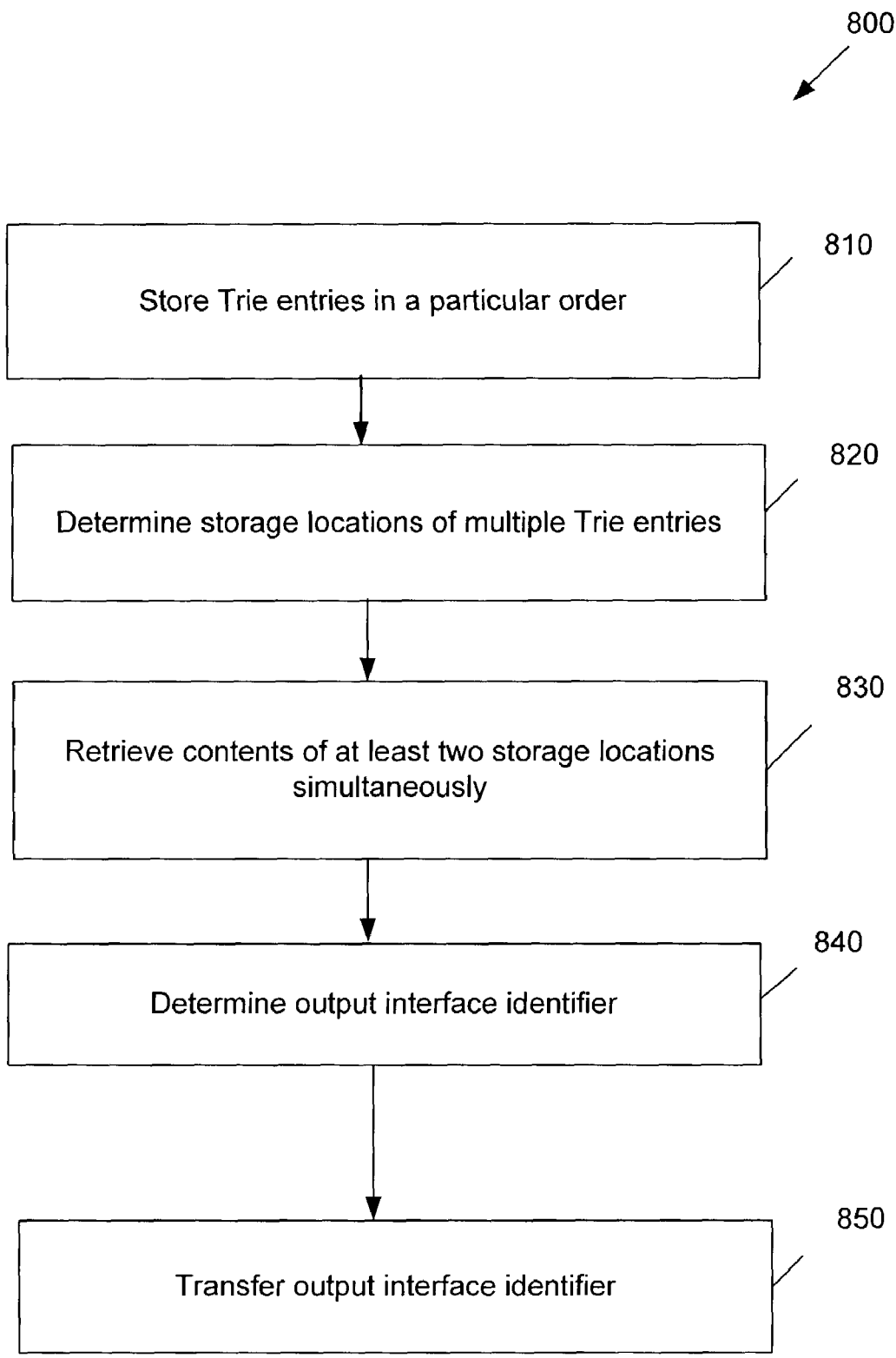
FIG. 8 depicts an example process that may be performed in accordance with an embodiment of the present invention.

FIG. 8 depicts an example process 800 that may be performed in accordance with an embodiment of the present invention. In action 810, Trie-entries may be stored into a storage device in an order so that storage locations associated with Trie-entries may be determined with a minimum number of sequential accesses. For example, action 810 may be implemented by storing Trie-entries using the relationship described with respect to FIG. 6. Entry storage location allocator 430 (FIG. 4) may perform action 810.

In action 820, a calculation may be performed to determine storage locations of multiple Trie-entries associated with a destination address. For example, the relationship described with respect to FIG. 7 may be used. Storage location determiner 510 (FIG. 5) may perform action 820. In action 830, one or more of the Trie-entries from storage locations determined in action 820 may be made available. For example, in action 830, the storage 410 may provide the Trie-entry or Trie-entries to output interface determiner 520.

In action 840, an output interface identifier associated with a destination address may be determined using one or more of the Trie-entries provided in action 830. For example, an output interface identifier may correspond to a destination MAC address or output port number. Output interface determiner 520 (FIG. 5) may perform action 840. In action 850, an output interface identifier may be transferred to the relevant destination. For example, in action 850, output interface determiner 520 may provide the output interface identifier to another device, such as one to establish a routing treatment of a packet.

Although some description has been made with respect to communications systems, the teachings provided herein may be applied to any situations to reduce storage reads. The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   storing entries in storage locations of a memory device;
   determining storage locations of entries associated with a destination address; and
   simultaneously retrieving entries associated with the destination address from multiple storage locations, wherein entries are derived from routing information and wherein determining the location of the entries is to comprise determining a storage location of an entry based on the following relationship: Root+(1+a first portion of the destination address)*BlockSize+a second portion of the destination address, wherein the Root is to comprise a storage location of a first storage location of a first block, and the BlockSize is to comprise an amount of storage locations allocated to entries in a first group of the entries.

2. The method of claim 1, wherein the storing comprises storing the first and a second group of entries.

3. The method of claim 2, wherein the storing comprises storing the first and second group of entries in storage locations according to a linear order.

4. The method of claim 1, wherein the determining further comprises determining a storage location of an entry among the first group of entries using the first portion.

5. The method of claim 1, wherein the determining further comprises determining a storage location of an entry among the second group of entries using the first and second portions.

6. The method of claim 5, wherein the determining the storage location of the entry among the second group of entries further comprises using an amount of storage locations allocated to entries in the first group of entries.

7. The method of claim 5, wherein the determining the location of the entry among the second group comprises using the following relationship:

Root+(1+first portion of the destination address)
*BlockSize+second portion of the destination
address, wherein Root comprises a storage location of a first storage location of the first block, and
BlockSize comprises an amount of storage locations allocated to entries in the first group.

8. The method of claim 1, wherein the storing comprises storing the first, a second, and a third group of entries.

9. The method of claim 8, wherein the storing comprises storing the first, second, and third group of entries in neighboring storage locations.

10. The method of claim 8, wherein the storing comprises storing the first, second, and third group of entries in storage locations according to a linear order.

11. The method of claim 8, wherein the destination address includes a first, second, and third portions.

12. The method of claim 11, wherein the determining further comprises using the first portion to determine a storage location of an entry among the first group of entries.

13. The method of claim 11, wherein the determining further comprises determining a storage location of an entry among the second group of entries using the first portion and the second portion.

14. The method of claim 11, wherein the determining further comprises determining a storage location of an entry among the third group of entries using the first portion, second portion, and third portion.

15. The method of claim 14, wherein the determining the storage location of the entry among the third group of entries further comprises using an amount of storage locations allocated to entries in the first and second groups and number of blocks within the first and second groups.

16. The method of claim 14, wherein the determining the storage location of the entry among the third group of entries comprises using the following relationship:

Root+(1+N+first portion*N+second portion)*Block-
Size+third portion, wherein

Root comprises a storage location of a first storage location of the first block,
BlockSize comprises an amount of storage locations allocated to entries in the first group, and
N comprises a number of blocks in the first and second groups.

17. The method of claim 1, further comprising using at least one of the retrieved entries to determine an output interface port number.

18. The method of claim 17, wherein each entry includes a next hop.

19. The method of claim 18, wherein each entry includes next block pointer.

20. The method of claim 1, wherein the storing further comprises:
   receiving routing information; and
   allocating routing information into entries of at least two Trie-blocks.

21. The method of claim 1, wherein the storing further comprises:
   allocating routing information into Trie-blocks;
   portioning Trie-blocks into at least a first, second and third group of Trie-blocks;
   associating a Trie-block of the first group with multiple Trie-blocks of the second group;
   associating each Trie-block of the second group with multiple Trie-blocks of the third group;
   storing Trie-blocks of each group in sequential storage locations; and
   storing Trie-blocks associated with the same Trie-block in sequential storage locations.

22. An apparatus comprising:
   a storage device to store entries in storage locations; and
   an output interface provider to retrieve simultaneously multiple entries associated with a destination address and to determine an output interface port number associated with the destination address,
   wherein entries are derived from routing information and wherein the output interface provide is to determine location of the entries based on the following relationship: Root+(1+a first portion of the destination address) *BlockSize+a second portion of the destination address, wherein the Root is to comprise a storage location of a first storage location of a first block, and the BlockSize is to comprise an amount of storage locations allocated to entries in a first group of the entries.

23. The apparatus of claim 22, wherein the output interface provider further comprises:
a storage location determiner to determine storage locations of entries associated with the destination address, and
an output interface determiner to determine the output interface port number using at least one of the retrieved entries.

24. The apparatus of claim 22, wherein the storage device is to store the first and a second group of entries.

25. The apparatus of claim 24, wherein the storage device is to store the first and second group of entries in storage locations according to a linear order.

26. The apparatus of claim 22, wherein the output interface provider is to determine a storage location of an entry among the first group of entries using the first portion.

27. The apparatus of claim 22, wherein the output interface provider is to determine a storage location of an entry among the second group of entries using the first and second portions.

28. The apparatus of claim 27, wherein the output interface provider is to determine the storage location of the entry among the second group of entries using an amount of storage locations allocated to entries in the first group of entries.

29. The apparatus of claim 27, wherein the output interface provider is to determine the location of the entry among the second group using the following relationship:

Root+(1+first portion of the destination address)*BlockSize+second portion of the destination address, wherein Root comprises a storage location of a first storage location of the first block, and
BlockSize comprises an amount of storage locations allocated to entries in the first group.

30. The apparatus of claim 22, wherein the storage device is to store a first, second, and third group of entries.

31. The apparatus of claim 30, wherein the storage device is to store the first, second, and third group of entries in neighboring storage locations.

32. The apparatus of claim 30, wherein the storage device is to store the first, second, and third group of entries in storage locations according to a linear order.

33. The apparatus of claim 30, wherein the destination address includes first, second and third portions.

34. The apparatus of claim 33, wherein the output interface provider is to determine a storage location of an entry among the first group of entries using the first portion.

35. The apparatus of claim 33, wherein the output interface provider is to determine a storage location of an entry among the second group of entries using the first and second portions.

36. The apparatus of claim 33, wherein the output interface provider is to determine a storage location of an entry among the third group of entries using the first portion, second portion, and third portion.

37. The apparatus of claim 36, wherein the output interface provider is to determine the storage location of the entry among the third group using an amount of storage locations allocated to entries in the first and second groups and number of blocks within the first and second groups.

38. The apparatus of claim 36, wherein the output interface provider is to determine the storage location of the entry among the third group using the following relationship:

Root+(1+N+first portion*N+second portion)*BlockSize+third portion, wherein

Root comprises a storage location of a first storage location of the first block,
BlockSize comprises an amount of storage locations allocated to entries in the first group, and
N comprises a number of blocks in the first and second groups.

39. The apparatus of claim 22, wherein each entry includes a next hop.

40. The apparatus of claim 39, wherein each entry includes next block pointer.

41. The apparatus of claim 22, further comprising an entry storage location allocator to receive routing information and to allocate routing information into entries of at least two Trie-blocks.

42. A system comprising:
an input interface port to receive a packet;
at least one output interface port to transmit the packet; and
an output interface determiner to identify an output interface port number to which to transfer the packet, the output interface determiner comprising:
a storage device to store entries in storage locations, and
an output interface provider to retrieve simultaneously multiple entries associated with a destination address of the packet and to determine the output interface port number associated with the destination address,
wherein entries are derived from routing information and the output interface provider is to determine location of the entries based on the following relationship: Root+(1+a first portion of the destination address)*BlockSize+a second portion of the destination address, wherein the Root is to comprise a storage location of a first storage location of a first block, and the BlockSize is to comprise an amount of storage locations allocated to entries in a first group of the entries.

43. The system of claim 42, wherein the output interface provider further comprises:
a storage location determiner to determine storage locations of entries associated with the destination address, and
an output interface determiner to determine the output interface port number using at least one of the retrieved entries.

44. The system of claim 42, wherein the packets are encoded in compliance with IEEE 802.3.

45. The system of claim 42, wherein the packets are encoded in compliance with SONET.

46. The system of claim 42, wherein the packets are encoded in compliance with SDH.

47. The system of claim 42, wherein the output interface port number comprises a media access control (MAC) address.

48. The system of claim 42, further comprising a switch fabric, wherein:
the switch fabric is to receive the packet and the output interface port number and to transfer the packet to an output interface port associated with the output interface port number.

* * * * *